US009022447B2

(12) United States Patent
Schidan et al.

(10) Patent No.: US 9,022,447 B2
(45) Date of Patent: May 5, 2015

(54) VEHICLE INTERIOR TRIM PART, IN PARTICULAR INSIDE DOOR LINING

(75) Inventors: Alexander Schidan, Solingen (DE); Bernd Brendel, Kempen (DE); Holger Kalus, Duisburg (DE); Cueneyt Deveci, Nettetal (DE)

(73) Assignee: Johnson Controls Technology Company, Holland, MI (US)

( * ) Notice: Subject to any disclaimer, the term of this patent is extended or adjusted under 35 U.S.C. 154(b) by 9 days.

(21) Appl. No.: 13/808,088

(22) PCT Filed: Jul. 4, 2011

(86) PCT No.: PCT/EP2011/003304
§ 371 (c)(1),
(2), (4) Date: May 17, 2013

(87) PCT Pub. No.: WO2012/000688
PCT Pub. Date: Jan. 5, 2012

(65) Prior Publication Data
US 2013/0229024 A1 Sep. 5, 2013

(30) Foreign Application Priority Data
Jul. 2, 2010 (DE) .................... 10 2010 025 941

(51) Int. Cl.
*B60R 13/04* (2006.01)
*B60R 13/02* (2006.01)
(52) U.S. Cl.
CPC ......... *B60R 13/0206* (2013.01); *B60R 13/0243* (2013.01)

(58) Field of Classification Search
CPC ............ B60R 13/0206; B60R 13/0243; B29L 2031/3014
USPC ........................ 296/1.08, 39.1, 146.7; 24/297
See application file for complete search history.

(56) References Cited

U.S. PATENT DOCUMENTS

| 7,114,221 | B2 * | 10/2006 | Gibbons et al. ................. 24/289 |
| 7,152,281 | B2 * | 12/2006 | Scroggie ......................... 24/297 |
| 7,213,378 | B2 * | 5/2007 | Randez Perez et al. ........ 52/704 |
| 2009/0218464 | A1 | 9/2009 | Kato et al. |

FOREIGN PATENT DOCUMENTS

| DE | 29809255 U1 | 9/1998 |
| DE | 10023109 A1 | 11/2001 |
| DE | 102004041685 B3 | 5/2006 |
| DE | 102004056603 A1 | 6/2006 |
| DE | 102008037617 A1 | 6/2009 |

(Continued)

OTHER PUBLICATIONS

PCT Notification of Transmittal of Translation of the International Preliminary Report on Patentability mailed Jan. 17, 2013.

(Continued)

*Primary Examiner* — Joseph D Pape
*Assistant Examiner* — Dana Ivey
(74) *Attorney, Agent, or Firm* — Fletcher Yoder, P.C.

(57) ABSTRACT

The present invention relates to a vehicle interior trim part with a first part and a second part which is fastened thereto, wherein the first and the second part have different coefficients of length expansion with respect to at least one influencing variable.

15 Claims, 5 Drawing Sheets

(56) References Cited

FOREIGN PATENT DOCUMENTS

| | | |
|---|---|---|
| EP | 0939234 A1 | 9/1999 |
| EP | 1571353 A2 | 7/2005 |
| GB | 2125878 A | 3/1984 |
| GB | 2424461 A | 9/2006 |
| JP | 10311312 A | 11/1998 |
| JP | 11344015 A | 12/1999 |

OTHER PUBLICATIONS

International Search Report for application No. PCT/EP2011/003304 mailed Nov. 21, 2011.

* cited by examiner

VEHICLE INTERIOR TRIM PART, IN PARTICULAR INSIDE DOOR LINING

This application claims priority from and the benefit of PCT Application No. PCT/EP2011/003304, filed on Jul. 4, 2011; and German Patent DE 10 2010 025 941, filed on Jul. 2, 2010; both entitled "Vehicle Interior Trim Part, In Particular Inside Door Lining", which are herein incorporated by reference.

BACKGROUND

The present invention relates to a vehicle interior trim part with a first part and a second part which is fastened thereto, wherein the first and the second part have different coefficients of linear expansion with respect to at least one influencing variable.

Such vehicle interior trim parts, for example inside door linings, are sufficiently well known from the prior art and have a first part, in particular a lining part, on which a second part, for example a fastening means, is arranged. If these two parts then have a different coefficient of linear expansion with respect to at least one influencing variable, for example temperature and/or humidity, and/or shrinkage occurs during the curing of one part, this often leads to cracks and/or deformations, in particular of the lining part.

It was therefore the object of the present invention to provide a vehicle interior trim part that does not have the disadvantages of the prior art.

The object is achieved by a vehicle interior trim part with a first part and a second part which is fastened thereto, wherein the first part and the second part have different coefficients of linear expansion with respect to at least one influencing variable and/or one part tends to shrink during curing, at least one part having an elastic fastening region.

SUMMARY

The present invention relates to a vehicle interior trim part, for example an inside door lining. This trim part has a first, generally two-dimensional part, preferably a lining part, which is preferably produced from a natural material and/or a plastic. Fastened to this first part is a second part. The fastening is preferably a material bond, which is achieved for example by adhesion, sealing, insert molding, injection in-mold lamination and/or compression in-mold lamination. The second part is preferably produced from a plastic.

According to the invention, the first and the second part have different coefficients of linear expansion with respect to at least one influencing variable. The influencing variable is, for example, temperature and/or humidity. Alternatively or in addition, one of the parts shrinks during curing.

Furthermore, according to the invention, the fastening region of the first and/or second part, preferably the second part, is provided as elastic. This elasticity has the effect of preventing material failure and/or deformation, in particular of the first part, so that it remains in particular visually attractive.

The fastening region according to the present invention is the region, in particular of the second part, that is connected with a material bond to the other part, the first part.

The fastening region is preferably provided as elastically deformable in the fastening plane.

The fastening region preferably has an elastic layer, which is preferably provided between the first and the second part.

It is preferred furthermore that the fastening region extends in the manner of a finger or fingers. This at least one finger may then preferably extend and retract and bend in the fastening plane.

The thickness of the fastening region is preferably reduced toward the edge, so that the elasticity of the fastening region increases toward the edge of the second part.

It is preferred furthermore that the fastening region is provided as hollow, at least in a portion or portions, whereby its elasticity is likewise increased.

According to a further preferred embodiment of the present invention, the vehicle interior trim part has a number of fastening regions, which extend in different spatial directions. This allows forces that act from different spatial directions to be absorbed better.

The fastening region of the second part preferably has relieving clearances, for example in the form of slits, which additionally increases the elasticity of the second component and/or of its connecting region.

The second part is preferably an injection-molded part of plastic, which with particular preference is molded directly onto the first part. During the curing, the material bond between the first and the second part preferably occurs. These injection-molded parts generally have an injection opening, which with most particular preference is part of the fastening region of the second part.

According to a further preferred embodiment, the second part has an extensible and/or resilient element, which is provided in particular between two fastening regions and/or two fastening clearances.

The first part is preferably a lining means and/or the second part is preferably a fastening means.

DRAWINGS

The invention is explained below on the basis of FIGS. 1-8. These explanations are given merely by way of example and do not restrict the general concept of the invention.

DETAILED DESCRIPTION

Figure 1:
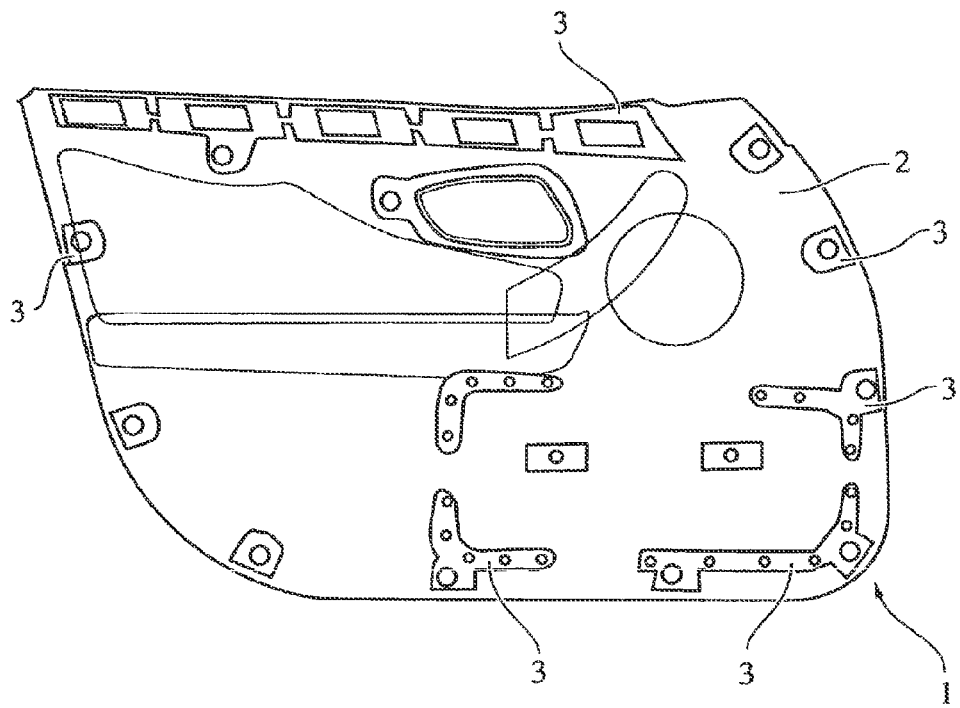
FIG. 1 shows the vehicle interior trim part according to the invention.

FIG. 1 shows the vehicle interior trim part 1 according to the invention, here an inside door lining, which has a first lining part 2 of a two-dimensional design. This lining part is preferably produced from a natural material, for example a fibrous natural material, and/or a plastic. Fastened to this first part 2, in particular to the rear side thereof, i.e. to the side facing away from the passenger compartment, there is or are at least one second part 3, here a number of second parts 3. This fastening preferably takes place by a material bond between the first and the second part 2, 3, which is achieved for example by adhesion and/or injection in-mold lamination. In the injection in-mold lamination, the material bond between the first and the second part takes place during the curing of the second part. The fact that the first part 2 and the second part 3 are produced from different materials means that their coefficient of linear expansion, for example under the influence of temperature and/or humidity, differs. Alternatively or in addition, the second part 3 shrinks during curing and/or the first part expands due to moisture that is passed from the second part into the first part. According to the invention, it is thus provided that at least one of the two parts has an elastic fastening region, which elastically deforms under the differing linear expansion. The size of the fastening region is calculated on the basis of the magnitude of the forces to be expected. The second part is, in particular, a fastening means, with which the first part is for example fastened to the door body of the vehicle and/or with which a third element is fastened to the first part.

Figure 2:
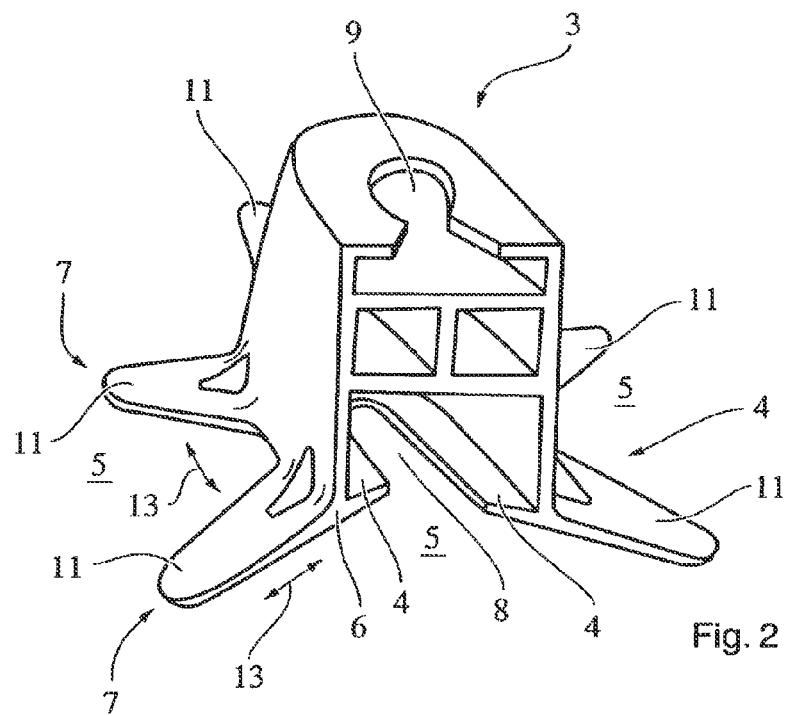
FIG. 2 shows an embodiment of a second part.

FIG. 2 shows a first embodiment of a second part. This has in its upper part a fastening clearance 9, by means of which the first part can be fastened to the vehicle body and/or with which a further element can be fastened to the first part. In the region of the second part that is facing away from the fastening clearance, the fastening region 4 is provided, designed in the present case in the manner of fingers 11. The fingers 11 are dimensioned such that, as represented by the double-headed arrows 13, they not only extend and retract but also bend in the fastening plane 5. The thickness of the fastening region 4, here in particular of the fingers 11, is dimensioned such that it decreases toward the edge of the second part 3. As a result, the elasticity of the fastening region increases toward the edge. Furthermore, the fastening region 4 has a relieving clearance 8, here a relieving slit, which provides additional elasticity for the second part in the fastening region.

Figure 3:
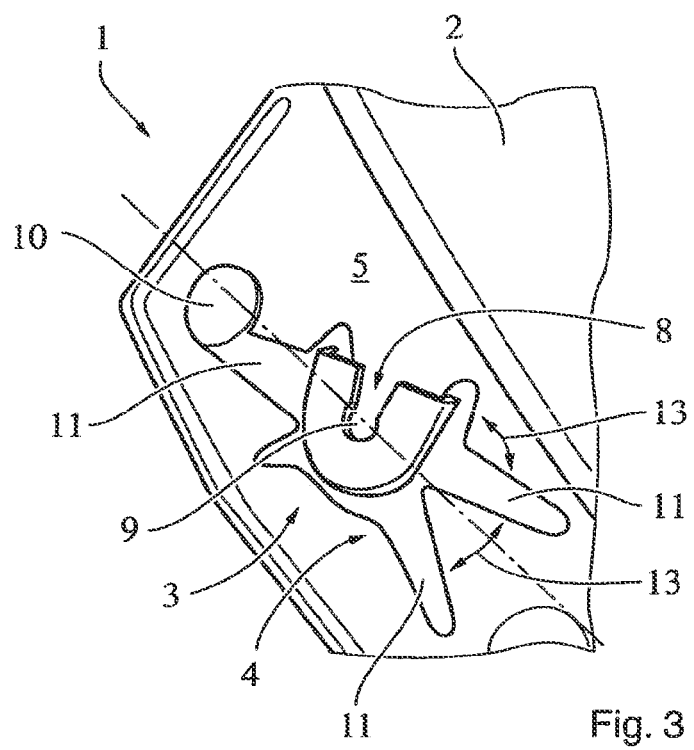
FIG. 3 shows a further embodiment of the vehicle interior trim part according to the invention.

FIG. 3 shows a further embodiment of the vehicle interior trim part 1 according to the invention. Here, too, the fastening region 4 of the second part 3 is provided in the manner of fingers which, as represented once again by the double-headed arrows 13, can not only extend and retract but also bend in the fastening plane 5. Reference is made to the statements made with respect to FIG. 2. In the present case, but also in the case of all other parts 2 presented here by way of example, it is an injection-molded part, which has an injection opening 10, from which the plastics material flows into the corresponding mold. It is thus preferably provided that this injection opening 10 is part of the fastening region 4.

Figure 4:
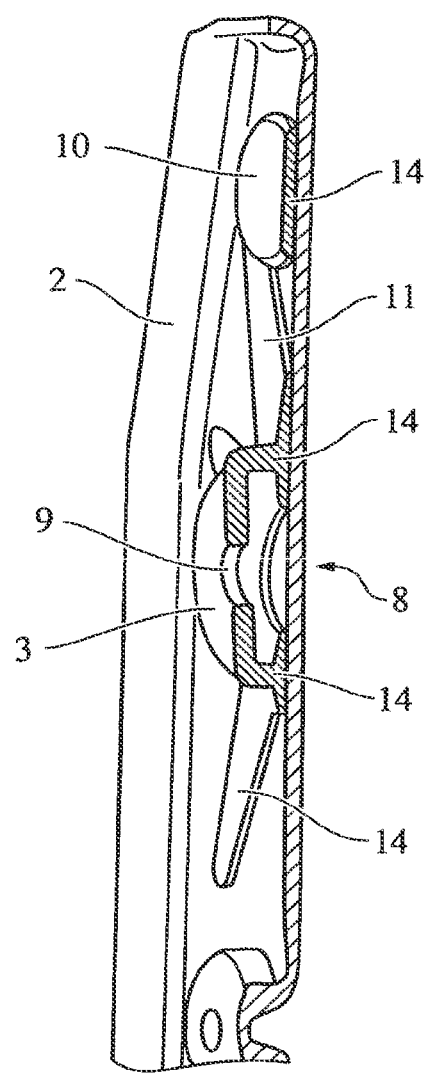
FIG. 4 shows a section through the vehicle interior trim part according to FIG. 3.

FIG. 4 shows a section through the vehicle interior trim part according to FIG. 3. It can be clearly seen that the second part is provided as hollow, at least in a portion or portions, which additionally increases the elasticity of the component and also represents a weight saving. In the present case, the injection opening 10 of the fingers 11 and the edge region of the fastening clearance 9 are provided as hollow 14. A person skilled in the art understands that it may, however, also be preferred to provide just one of these regions as hollow.

Figure 5:
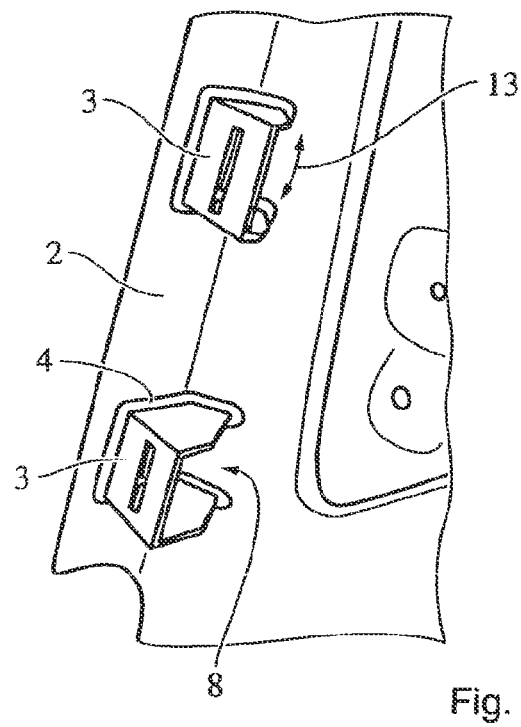
FIG. 5-8 show further embodiments of the vehicle interior trim part according to the invention.

FIG. 5 shows a further embodiment of the vehicle interior trim part according to the invention. Reference is made to the statements made with respect to the previously discussed figures.

Figure 6:
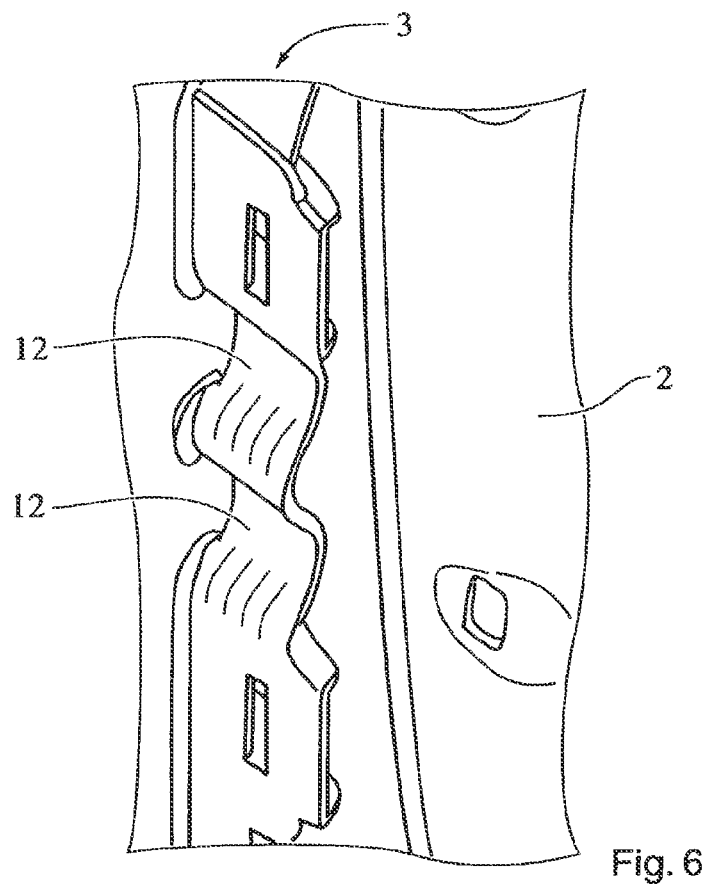

FIG. 6 shows a further embodiment of the vehicle interior trim part according to the invention. In the present case, the second part has extensible and/or resilient means 12, which can elastically extend and/or retract when there is an expansion of the first part and thereby avoid stresses in the first part.

Figure 7:
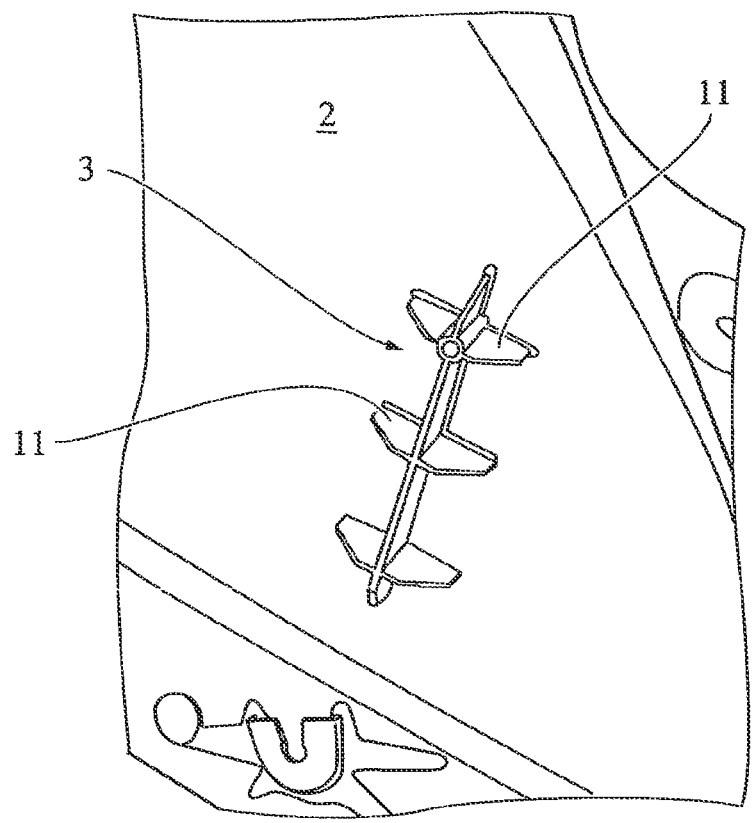

FIG. 7 shows a further embodiment of the vehicle interior trim part according to the invention. Reference is made to the statements made with respect to FIGS. 1-6.

Figure 8:
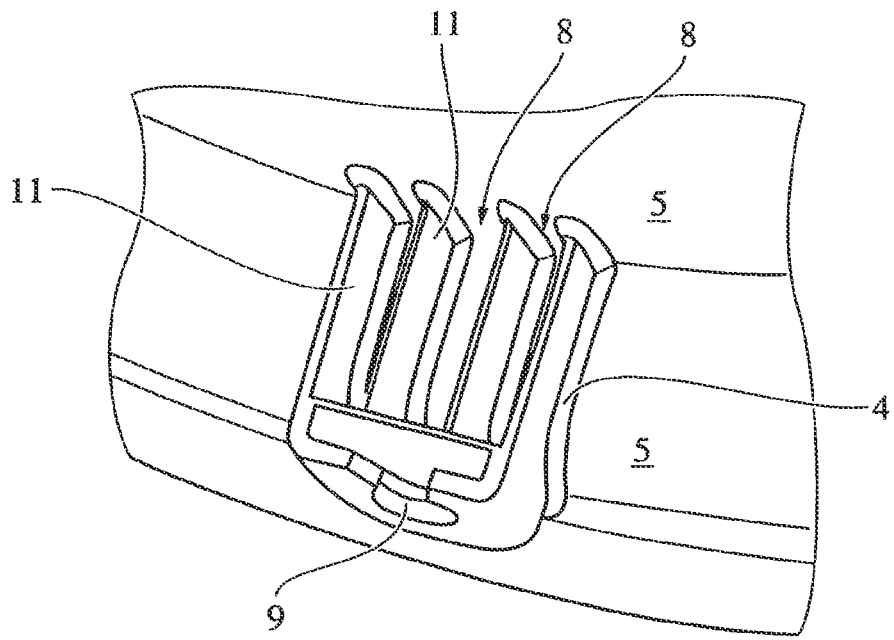

FIG. 8 shows a further embodiment of the vehicle interior trim part according to the invention. In the present case, the fastening region 4 is of a three-dimensional design. Otherwise, the statements made with respect to the previous figures apply.

The invention claimed is:

1. A vehicle interior trim part comprising:
a first lining part having a first contact surface and a second lining part having a second contact surface, wherein the first contact surface faces the second lining part and the second contact surface faces the first lining part, the first contact surface is fastened to the second contact surface, and the first lining part and the second lining part have different coefficients of linear expansion with respect to at least one influencing variable;
wherein the first contact surface is on a first elastic region of the first lining part or the second contact surface is on a second elastic region of the second lining part.

2. The vehicle interior trim part as claimed in claim 1, wherein the first or second elastic region is elastically deformable in a bonding plane between the first and second contact surfaces.

3. The vehicle interior trim part as claimed in claim 1, wherein the first or second elastic region has an elastic layer.

4. The vehicle interior trim part as claimed in claim 1, wherein the first or second elastic region includes at least one finger extending radially outward along the respective contact surface.

5. The vehicle interior trim part as claimed in claim 1, wherein the thickness of the first or second elastic region decreases toward an edge of the first or second elastic region.

6. The vehicle interior trim part as claimed in claim 1, wherein at least a portion of the first or second elastic region is hollow.

7. The vehicle interior trim part as claimed in claim 1, wherein the first or second lining part has at least two elastic regions which point in different spatial directions.

8. The vehicle interior trim part as claimed in claim 1, wherein the first or second elastic region has relieving clearances.

9. The vehicle interior trim part as claimed in claim 1, wherein the second lining part is a plastic injection-molded part having an injection opening that is part of the first or second elastic region.

10. The vehicle interior trim part as claimed in claim 1, wherein the second lining part has an extensible element and/or a resilient element.

11. The vehicle interior trim part as claimed in claim 1, wherein the first lining part or the second lining part comprises a fastening device.

12. The vehicle interior trim part as claimed in claim 1, wherein the first lining part is formed from a natural material, a plastic, or a combination thereof.

13. The vehicle trim part as claimed in claim 1, wherein the first contact surface and the second contact surface are bonded via an injection in-mold lamination.

14. The vehicle trim part as claimed in claim 1, wherein the first contact surface and the second contact surface are bonded via an adhesive bond.

15. The vehicle trim part as claimed in claim 1, wherein the first contact surface is on the first elastic region of the first lining part, and the second contact surface is on the second elastic region of the second lining part.

* * * * *